A. C. JOHNSON.
TRACK CHAIN.
APPLICATION FILED APR. 23, 1919.

1,333,175.

Patented Mar. 9, 1920.

WITNESS
Wm. F. Drew

INVENTOR.
Alfred C. Johnson
BY
Booth & Booth
ATTORNEYS

UNITED STATES PATENT OFFICE.

ALFRED C. JOHNSON, OF SAN JOSE, CALIFORNIA.

TRACK-CHAIN.

1,333,175.   Specification of Letters Patent.   Patented Mar. 9, 1920.

Application filed April 23, 1919. Serial No. 292,190.

*To all whom it may concern:*

Be it known that I, ALFRED C. JOHNSON, a citizen of the United States, residing at San Jose, in the county of Santa Clara and State of California, have invented certain new and useful Improvements in Track-Chains, of which the following is a specification.

The present invention relates to a track-chain for use upon vehicles, and constitutes an improvement upon the chain for which United States Letters Patent No. 1,194,635 were issued to me August 15, 1916.

The object of my invention is to provide a track-chain which, because of the small number of parts employed can be manufactured comparatively cheaply, and which is of sufficiently rigid construction to withstand the strains imposed upon it when used as the driving tread of a traction-engine.

Figure 1:
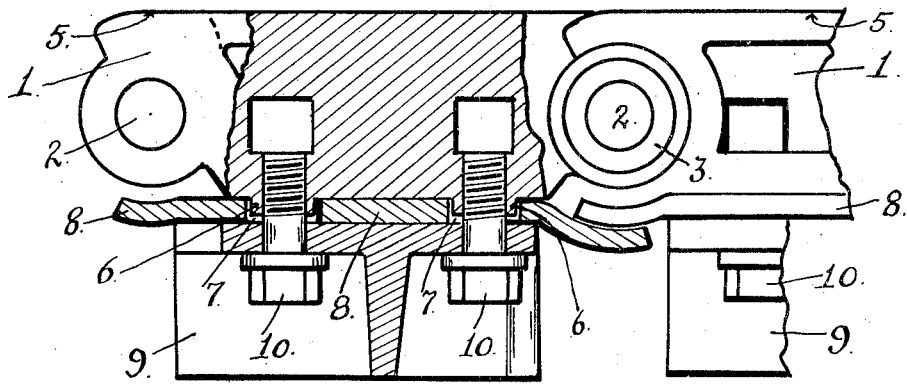

My invention will be hereinafter fully-described by reference to the accompanying drawings, wherein, Figure 1 is a side view, broken, partly in elevation and partly in vertical section, of one link section of my chain, taken on line 1—1 of Fig. 2.

Figure 2:
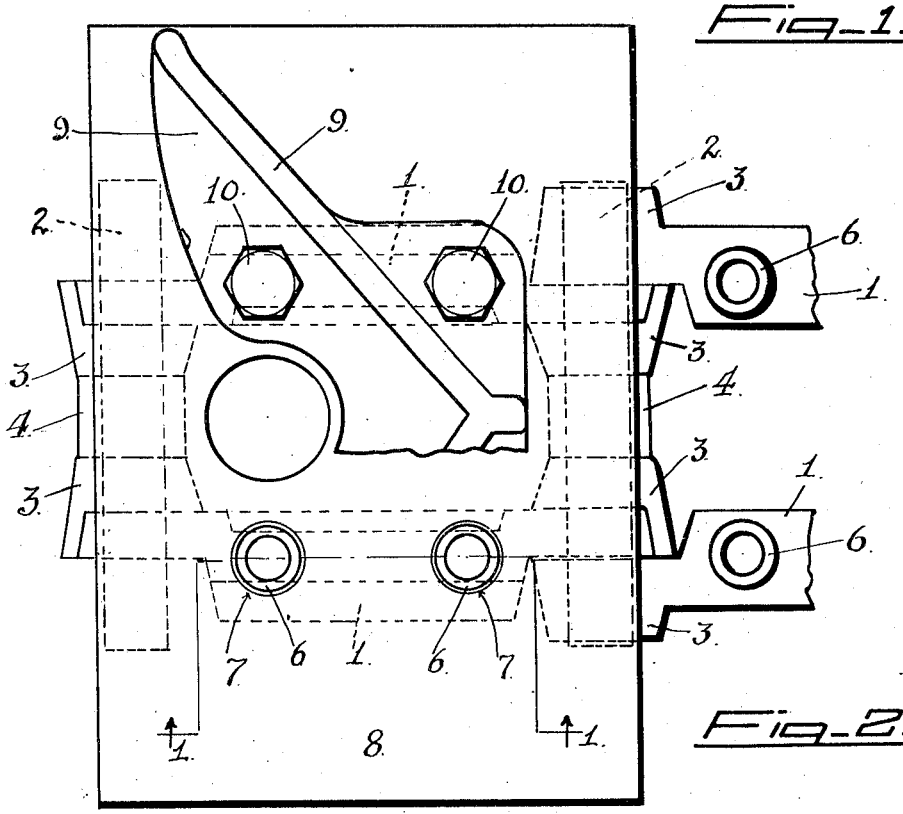

Fig. 2 is a bottom plan view, the grouser being broken away to show the overlying shoe.

In the drawings, the reference numeral 1 designates side link members of a chain, one complete link of said chain being formed by two such members, positioned parallel to each other and spaced as shown in Fig. 2, and united at each end by a transverse pin 2. The link members 1 are formed with offset bosses 3 at their ends, said bosses being drilled to provide bearings in which the pins 2 are carried. As shown in Fig. 2 the link members 1 are arranged in pairs, the pin bosses 3 of each alternate pair being directed inwardly, and those of the intervening pair being directly outwardly, each pin 2 being common to two adjacent pairs of link members. Spacing collars 4, preferably formed integrally with the pins 2, are interposed between the inwardly directed link member bosses 3, said collars having approximately the same outside diameter as said bosses, thus providing a substantially cylindrical structure adapted for engagement with the teeth of a sprocket, not shown in the drawings.

The link members 1 are formed upon one edge with a substantially straight surface 5, Fig. 1, adapted to form a continuous track upon which weight carrying wheels or rollers, not shown, may operate. Upon the other edge said link members are provided each with a pair of spaced bosses 6 adapted to pass through holes 7 in a shoe 8. Beneath the shoe 8 is placed a grouser 9, the whole structure of each link, comprising the pair of side members 1, the shoe 8, and the grouser 9, being rigidly bolted together by cap-screws 10 threaded into holes in the link member bosses 6. In order that the shoe 8 may be securely clamped between the grouser 9 and the link members 1, the height of bosses 6 of the latter is slightly less than the thickness of said shoe as shown in Fig. 1.

The two link members 1 of each pair are thus rigidly interlocked with the shoe 8 by the relatively large bosses 6, the screws 10 merely taking the strain of the grouser 9 and serving to clamp the whole structure together and hold the members thereof in interlocking relation.

By the use of said bosses 6, I am enabled to secure the necessary strength and rigidity for the link structure without the use of additional means for supporting or uniting together the two side link members 1. Moreover this construction leaves the space between the two side link members free, thereby permitting the use of sprockets having teeth of relatively great angular length. Thus the strength of said sprockets is relatively great, and the cost of manufacture of both track-chain and sprockets is naturally reduced.

I claim:

1. A track-chain link comprising a pair of parallel spaced side members; a projecting boss formed upon one edge of each of said side members; a shoe provided with apertures adapted to receive the bosses of said side members, the height of said bosses being less than the depth of said apertures; means for securing said shoe and said side members together, and transversely disposed pins extending between and having bearings in the adjacent ends of said side members.

2. In a track-chain, a link comprising a pair of spaced parallel side members; a boss projecting outwardly from the outer edge of each side member; a shoe provided with apertures adapted to receive said bosses in close fitting relation, the height of said bosses being less than the depth of said apertures; a grouser positioned adjacent to the exterior surface of said shoe; means for clamping said grouser, said shoe and said side members together; and transversely disposed pins extending between and having bearings in the adjacent ends of said side members.

3. In a track-chain, a link comprising a pair of spaced, parallel side members; a boss projecting outwardly from the outer edge of each side member; a shoe provided with apertures adapted to receive said bosses, the height of said bosses being less than the depth of said apertures; a grouser positioned adjacent to the exterior surface of said shoe; bolts fitted through said grouser and shoe apertures and threaded into the side members through their bosses, whereby the grouser, shoe and side members are clamped together; and transversely disposed pins extending between and having bearings in the adjacent ends of said side members.

In testimony whereof I have signed my name to this specification in the presence of two subscribing witnesses.

ALFRED C. JOHNSON.

Witnesses:
WM. F. BOOTH,
WILLIAM F. BOOTH, Jr.